(12) United States Patent  
Rajamani

(10) Patent No.: US 8,406,205 B2
(45) Date of Patent: Mar. 26, 2013

(54) APPARATUS AND METHOD FOR CHANNEL RESERVATION IN WIRELESS COMMUNICATION SYSTEMS

(75) Inventor: Krishnan Rajamani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1055 days.

(21) Appl. No.: 11/869,675

(22) Filed: Oct. 9, 2007

(65) Prior Publication Data

US 2009/0040984 A1    Feb. 12, 2009

Related U.S. Application Data

(60) Provisional application No. 60/954,757, filed on Aug. 8, 2007.

(51) Int. Cl.
*H04Q 7/24*   (2006.01)
*H04B 7/212*   (2006.01)

(52) U.S. Cl. ......... 370/338; 370/347; 370/348; 370/349

(58) Field of Classification Search ................... 370/337, 370/338, 345, 348, 349
See application file for complete search history.

(56) References Cited

U.S. PATENT DOCUMENTS

| | | | |
|---|---|---|---|
| 2005/0238084 A1* | 10/2005 | Kuperschmidt et al. | 375/133 |
| 2005/0249183 A1* | 11/2005 | Danon et al. | 370/347 |
| 2006/0161910 A1* | 7/2006 | Bonsteel et al. | 717/170 |
| 2007/0019607 A1* | 1/2007 | Sugaya et al. | 370/347 |
| 2007/0092046 A1* | 4/2007 | Lee | 375/346 |
| 2007/0133483 A1* | 6/2007 | Lee et al. | 370/338 |
| 2007/0153717 A1 | 7/2007 | Tervonen et al. | |
| 2007/0213012 A1* | 9/2007 | Marin et al. | 455/63.3 |
| 2008/0225790 A1* | 9/2008 | Kupershmidt | 370/330 |
| 2010/0118785 A1* | 5/2010 | Sugaya | 370/328 |

FOREIGN PATENT DOCUMENTS

| | | |
|---|---|---|
| EP | 1315093 A1 | 5/2003 |
| JP | 2003174455 A | 6/2003 |
| RU | 2264036 | 10/2004 |
| RU | 2276400 C2 | 5/2006 |
| WO | WO0031932 A1 | 6/2000 |
| WO | WO0176098 A2 | 10/2001 |

(Continued)

OTHER PUBLICATIONS

ECMA-368 "High Rate ultra Wideband PHY and MAC Standard," Dec. 1, 2005, pp. 1-312, XP002504634.

(Continued)

*Primary Examiner* — Andrew Lee
(74) *Attorney, Agent, or Firm* — James Hunt Yancey, Jr.

(57) ABSTRACT

An exemplary method for reserving medium access in an ad hoc network comprises transmitting a reservation request by a reservation owner, the reservation request identifying a reservation allocation, a reservation target, and a reservation type. The reservation type identifies exclusive use of the reservation allocation by the reservation owner and the reservation target during a reservation period. The reservation target may employ a prioritized contention access (PCA) scheme to access the reservation allocation. Alternatively, an idle portion of the reservation allocation may be subdivided into a plurality of slots including even slots and odd slots, and the reservation owner gains access to the idle portion by starting to transmit during an even slot, while the reservation target gains access to the idle portion by starting to transmit during an odd slot. In yet another embodiment, the reservation owner transmits an outgoing clear to send (CTS) communication to the reservation target to transfer ownership of the reservation allocation to the reservation target, and receives an incoming clear to send (CTS) communication from the reservation target to regain ownership of the reservation allocation.

28 Claims, 4 Drawing Sheets

FOREIGN PATENT DOCUMENTS

| WO | WO2005034433 A1 | 4/2005 |
| --- | --- | --- |
| WO | WO2005076543 | 8/2005 |
| WO | WO2005094007 A1 | 10/2005 |

OTHER PUBLICATIONS

IEEE 802.11, "Part 11: Wireless LAN Medium Access Control (MAC) and Physical Layer (PHY) Specifications," IEEE Computer Society, 2007.

International Search Report and Written Opinion—PCT/US08/072681, International Search Authority—European Patent Office, Nov. 28, 2008.

IEEE Std. 802.15.3 "IEEE, Wireless Medium Access Control (MAC) and Physical Layer (PHY) Specifications for High Rate Wireless Personal Area Networks (WPANs)," IEEE, Sep. 29, 2003.

Translation of Japanese Office Action, mailed Apr. 10, 2012, pp. 1-3, Patent Application No. 2010-520335, Examiner's Notice Date Apr. 4, 2012.

* cited by examiner

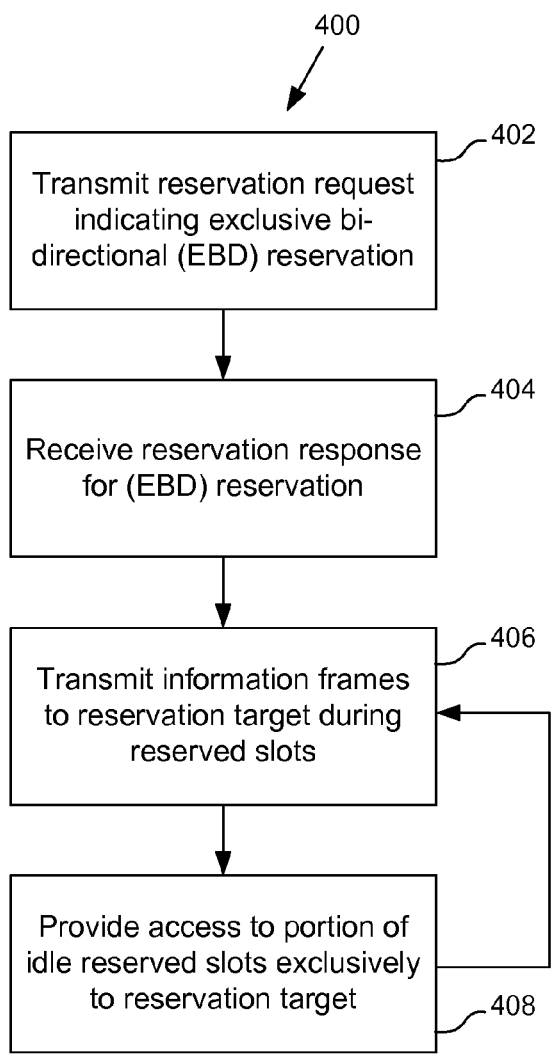
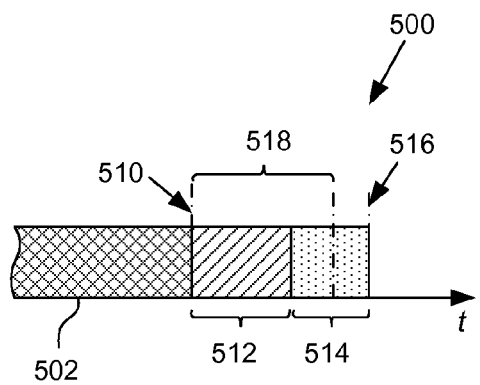
FIG. 5
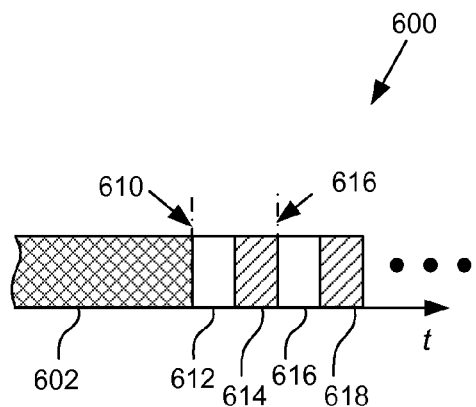
FIG. 6
FIG. 4
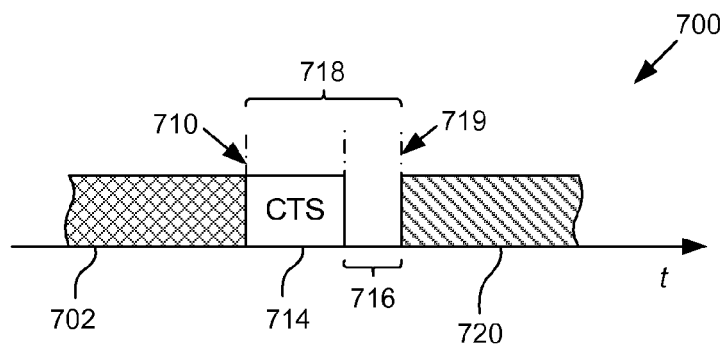
FIG. 7

APPARATUS AND METHOD FOR CHANNEL RESERVATION IN WIRELESS COMMUNICATION SYSTEMS

RELATED APPLICATIONS

The present Application for Patent claims priority to Provisional Application No. 60/954,757 entitled "APPARATUS AND METHOD FOR CHANNEL RESERVATION IN WIRELESS COMMUNICATION SYSTEMS" filed Aug. 8, 2007, and assigned to the assignee hereof and hereby expressly incorporated by reference herein.

TECHNICAL FIELD

The following description relates generally to wireless communications and more particularly to Ultra Wideband ad hoc wireless communications networks.

BACKGROUND

Wireless networking systems have become a prevalent means by which a large number of people worldwide communicate. Wireless communication devices have become smaller and more powerful to meet consumer needs, which include improved portability and convenience. Users have found many uses for wireless communication devices, such as cellular telephones, personal digital assistants (PDAs), notebooks, and the like, and such users demand reliable service and expanded coverage areas.

Wireless communications networks are commonly utilized to communicate information regardless of where a user is located (inside or outside a structure) and whether a user is stationary or moving (e.g., in a vehicle, walking). Generally, wireless communications networks are established through a mobile device communicating with a base station or access point. The access point covers a geographic region or cell and, as the mobile device is operated, it may move in and out of these geographic cells. To achieve uninterrupted communication the mobile device is assigned resources of a cell it has entered and de-assigned resources of a cell it has exited.

A network can also be constructed utilizing solely peer-to-peer communication without utilizing access points. In further embodiments, the network can include both access points (infrastructure mode) and peer-to-peer communication. These types of networks are referred to as ad hoc networks). Ad hoc networks can be self-configuring whereby when a mobile device (or access point) receives communication from another mobile device, the other mobile device is added to the network. As the mobile devices leave the area, they are dynamically removed from the network. Thus, the topography of the network can be constantly changing. In a multihop topology, a transmission is transferred though a number of hops or segments, rather than directly from a sender to a recipient.

Various factors can affect the efficiency and performance of wireless communication in networks, such as an Ultra Wideband (UWB) ad hoc network. For example, the amount of traffic or data communication occurring in a coverage area can reduce data transmission times and produce interference. Therefore, the quality of service (QoS) for communication can be affected by the other communications occurring in the network at substantially the same time. In exclusion-based schemes, such as Carrier Sense Multiple Access with Collision Avoidance (CSMA/CA) utilized in wireless LAN (IEEE 802.11) and UWB, the number of simultaneous transmissions and the data throughput may be reduced if there is interference present in the network.

In various system implementations, a channel reservation scheme is provided to allow devices to negotiate access to the channel medium. The efficacy of these reservations, especially for two-party use, depends on the application traffic profile.

SUMMARY

An exemplary method for reserving medium access in an ad hoc network, comprises transmitting a reservation request by a reservation owner, the reservation request identifying a reservation allocation, a reservation target, and a reservation type. One such reservation type identifies exclusive use of the reservation allocation by the reservation owner and the reservation target during a reservation period. The reservation target may employ a typical prioritized contention access (PCA) scheme to access the idle medium during the reservation period, and the reservation owner may access the idle medium preferentially (i.e. without the need to invoke PCA backoffs). To ensure balanced two-party use, an equal number of such reservation allocations may be created, for each of the two sides as the owner. Alternatively, each idle portion of the reservation allocation may be subdivided into a plurality of slots including even slots and odd slots, and the reservation owner gains access to the medium by initiating its transmission during an even slot (after which the medium is no longer considered idle until it ceases transmission); while the reservation target gains access to the idle medium by initiating its transmission during an odd slot. In yet another embodiment, the reservation owner transmits an outgoing clear to send (CTS) communication to the reservation target to transfer ownership of the reservation allocation to the reservation target, and receives an incoming clear to send (CTS) communication from the reservation target to regain ownership of the reservation allocation.

BRIEF DESCRIPTION OF THE DRAWINGS

FIG. 4 is a flow chart illustrating an exemplary method for reserving medium access in accordance with one embodiment.

FIGS. 5-7 are graphs for illustrating exemplary methods for providing access to a reservation allocation in accordance with various embodiments.

DETAILED DESCRIPTION

Figure 1:
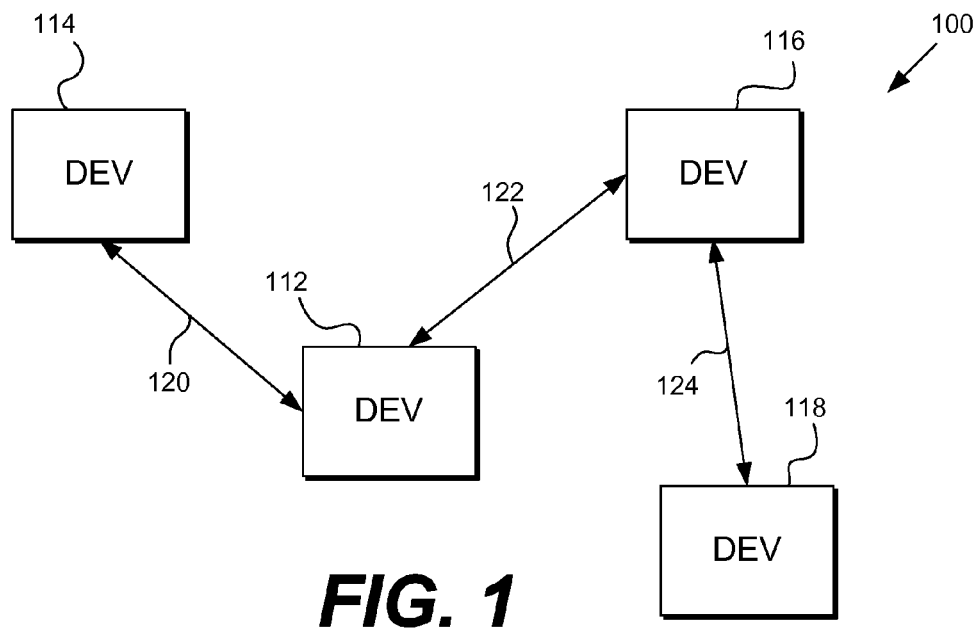
FIG. 1 illustrates an exemplary ad hoc wireless network in accordance with one embodiment

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a user device. A user device can also be called a system, a subscriber unit, subscriber station, mobile station, mobile device, remote station, access point, base station, remote terminal, access terminal, terminal device, handset, host, user terminal, terminal, user agent, wireless terminal, wireless device, or user equipment. A user device can be a cellular telephone, a cordless telephone, a Session Initiation Protocol (SIP) phone, a wireless local loop (WLL) station, a Personal Digital Assistant (PDA), a handheld device having wireless connection capability, or other processing device(s) connected to a wireless modem. In certain embodiments, the user device may be a consumer electronics device with a UWB modem attached, such as printer, camera/camcorder, music player, standalone magnetic or flash storage device, or other AV equipment with content storage, for example.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various embodiments will be presented in terms of systems that may include a number of devices, components, modules, and the like. It is to be understood and appreciated that the various systems may include additional devices, components, modules, and the like, and/or may not include all of the devices, components, modules and so forth, discussed in connection with the figures. A combination of these approaches may also be used.

With reference now to the drawings, FIG. 1 illustrates example ad hoc wireless network 100. Wireless network 100 can include any number of mobile devices or nodes, of which four are illustrated for ease of illustration, that are in wireless communication. Mobile devices can be, for example, cellular phones, smart phones, laptops, handheld communication devices, handheld computing devices, satellite radios, global positioning systems, Personal Digital Assistants (PDAs), and/or other suitable devices for communicating over wireless network 100, as discussed above. Wireless network 100 can also include one or more base stations or access points (not shown).

Figure 2:
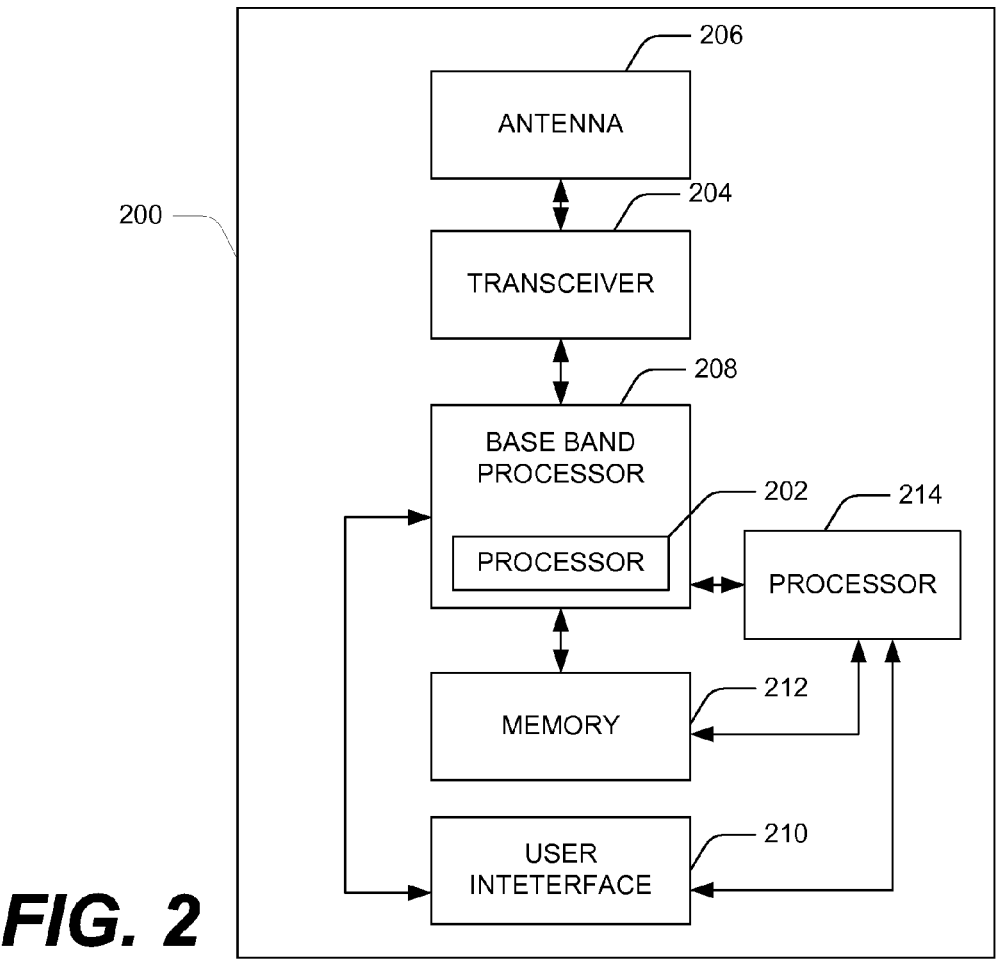
FIG. 2 illustrates an exemplary wireless terminal device in accordance with one embodiment.

In wireless network 100, terminal device 112 is shown communicating with terminal device 114 via communication link 120 and with terminal device 116 via communication link 112. Terminal device 116 is also shown communicating with terminal device 118 via communication link 124. Terminal devices 112, 114, 116 and 118 may be structured and configured in accordance with the exemplary simplified block diagram of a possible configuration of a terminal device 200 as shown in FIG. 2. As those skilled in the art will appreciate, the precise configuration of terminal device 200 may vary depending on the specific application and the overall design constraints. Processor 202 can implement the systems and methods disclosed herein.

Terminal device 200 can be implemented with a front-end transceiver 204 coupled to an antenna 206. A base band processor 208 can be coupled to the transceiver 204. The base band processor 208 can be implemented with a software based architecture, or other type of architectures, such as hardware or a combination of hardware and software. A microprocessor can be utilized as a platform to run software programs that, among other functions, provide control and overall system management function. A digital signal processor (DSP) can be implemented with an embedded communications software layer, which runs application specific algorithms to reduce the processing demands on the microprocessor. The DSP can be utilized to provide various signal processing functions such as pilot signal acquisition, time synchronization, frequency tracking, spread-spectrum processing, modulation and demodulation functions, and forward error correction.

Terminal device 200 can also include various user interfaces 210 coupled to the base band processor 208. User interfaces 210 can include a keypad, mouse, touch screen, display, ringer, vibrator, audio speaker, microphone, camera, storage and/or other input/output devices.

The base band processor 208 comprises a processor 202. In a software-based implementation of the base band processor 208, the processor 202 may be a software program running on a microprocessor. However, as those skilled in the art will readily appreciate, the processor 202 is not limited to this embodiment, and may be implemented by any means known in the art, including any hardware configuration, software configuration, or combination thereof, which is capable of performing the various functions described herein. The processor 202 can be coupled to memory 212 for the storage of data. An application processor 212 for executing application operating system and/or separate applications may also be provided as shown in FIG. 2. Application processor 212 is shown coupled to base band processor 208, memory 212, and user interface 210.

Figure 3:
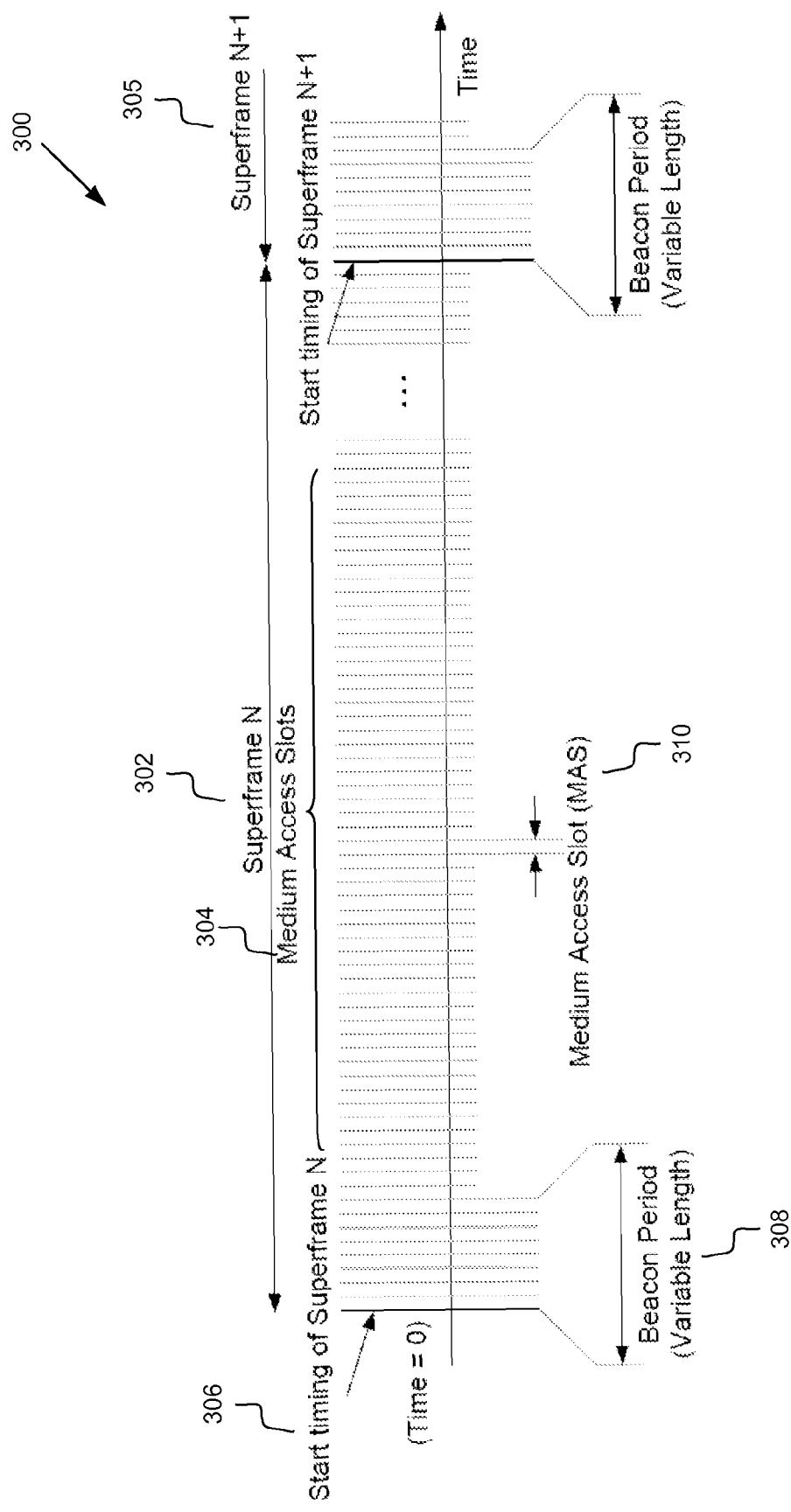
FIG. 3 illustrates an exemplary medium access channel superframe structure in accordance with one embodiment.

Referring back to FIG. 1, allocation of the resources associated with communication links 120, 122 and 124 will be now described in conjunction with the medium access control (MAC) super-frame structure of FIG. 3. The MAC service and protocol defined in the MAC sublayer relies upon services provided by the physical (PHY) later via PHY service access points. The MAC service also provides services to higher layer protocols or adaptation layer via MAC service access points. In the exemplary embodiment described, the PHY layer may be an ultra wideband (UWB) physical layer for a wireless personal area network, such as that conforming to the Ecma International standard, ECMA-368, for example. It is noted that the benefits of the various embodiments are also suitable for use with other ad hoc network arrangements, including, for example, future or modified versions of IEEE 802.11 or IEEE 802.15 ad hoc networks.

FIG. 3 depicts basic time structure 300 for frame exchange using a superframe structure, such as Superframe N 302. By way of example, superframe N 302 may have a superframe duration corresponding to a superframe length. In one embodiment, superframe N 302 may comprise 256 medium access slots (MAS) 304, each MAS having a duration of length 310 equal to 256 microseconds (μs). In this embodiment superframe N 302 has a corresponding superframe duration approximately equal to 65 milliseconds (ms). As shown in FIG. 3, a superframe includes a beacon period 308 at the start 306 of each superframe, including superframe N 302 and superfame N+1 305

Typically, during beacon period 308, terminal devices only send beacons (i.e., beacon frames) and listen to neighboring beacons. MAS may also be reserved, and devices participating in the reservation comply with the reservation type defined for those reserved slots. Outside of the beacon period and reserved slots, terminal devices typically employ an access contention-based scheme. In certain other embodiments, there may only be a single beaconing entity for the entire network 100.

Current MAS reservation implementations generally define four types of reservations: hard, soft, prioritized contention access (PCA), and private. A reservation is initiated by a terminal device requesting to be a reservation owner, and is a request to reserve one or more MAS for sending information to a reservation target.

In a hard reservation (e.g., as in ECMA 368), the reservation owner maintains exclusive use of the reserved slots during the reservation period, and no other terminal device, including the reservation target, may transmit information. The target may only transmit MAC layer control packets, such as ACK, in response to the owner's transmissions. Because a terminal device may request a reservation period larger than that needed to transmit the data packets, a portion of the reservation period may involve idle, and therefore wasted, utilization of the communication channel, which is one of the disadvantages of the hard reservation. The reservation owner may release the reservation by transmitting an appropriate announcement and awaiting a reply; however, such additional transactions incur processing and time delay penalties.

In a soft reservation (e.g., as in ECMA 368), the reservation owner is given priority over other devices in the network for access to the reserved slots during the reservation period. The slots associated with idle portions of the reservation period can be utilized by other "lower priority" terminal devices, such as the reservation target or any other neighboring terminal devices, in the network using a collision avoidance scheme. Thus, a soft reservation provides utilization of the idle portion of the reservation period using a contention scheme.

In a PCA reservation, slots are reserved for transmission, but all terminal devices, including the reservation owner, the reservation target and any other neighboring terminal devices, utilize a collision avoidance scheme, such as Carrier Sense Multiple Access/Collision Avoidance (CSMA/CA), to gain access to the reserved slots during the reservation period. This imposes the PCA access overhead (backoffs) on the reservation owner as well.

In the three reservation schemes discussed above (hard, soft, PCA), a provision for bi-direction communication between devices is inflexible and/or inefficient. For example, in the hard reservation, bi-direction communication would require two separate hard reservations, since usage of the reserved slots are exclusive to the reservation owner. Moreover, fixed hard reservations are inflexible and inadaptable to varying traffic ratios in the two directions, or would otherwise require explicit a priori information about the traffic ratios to efficiently allocate the reserved slots. For example, since it is not possible for a pair of devices to make two hard reservations, one in each direction, each with the full super-frame capacity, there will be loss of throughput if the application reverses the direction for the bulk of its traffic. The soft reservation and PCA reservation scheme suffer degraded channel conditions due to the channel access contention from other devices on the network, thereby limiting optimal bi-directional communication between a reservation owner and a reservation target. While private reservations are enabled for use in certain systems, the definition of the channel access strategy is left to the implementation designer.

Referring to FIG. 4, flow chart 400 depicts an exemplary method for reserving medium access according to one embodiment. Flow chart 400 facilitates a pair of terminal devices, such as terminal devices 112 and 114 of FIG. 1, for example, to communicate efficiently with each other and in a flexible manner, and is particularly beneficial in an ad hoc network, such as network 100 of FIG. 1.

At step 402, a reservation owner transmits a reservation request. The reservation request is typically transmitting as part of a command frame (or as a Beacon Information Element). Among other information items, the reservation request may include the identification of the reservation owner, the identification of the reservation target, an allocation request for one or more slots (MASs) for reservation, and the reservation type. For convenience, the allocation of MASs are also collectively referred hereinto as a reservation allocation (or simply "reservation"), even though the slots reserved may be distributed contiguously or fragmented across the superframe. The reservation type indicated during step 402 identifies exclusive use of the reservation allocation by the reservation owner and the reservation target during the period of reservation. Such a reservation type may be an implementation specific "private" reservation for medium access (e.g., identified by application-specific identifiers), or may be an explicit reservation type for exclusive bi-direction (EBD) reservation, if adopted into a standard implementation. For purposes of the present disclosure, both reservation types will be referred hereinto as EBD reservations since both reservation types, whether private or explicit, provide bi-direction medium access exclusively to the reservation owner and the reservation target.

At step 404, the reservation owner receives a reservation response. For example, the reservation target may transmit the reservation response in reply to the reservation request of step 402. At step 406, the reservation owner optionally transmits information frames to the reservation target during one or more of the reserved slots. At the conclusion of transmission by the reservation owner, there may remain an idle portion (idle reserved slots) of the reservation allocation during the remaining portion of the reservation period.

At step 408, the idle portion of the reservation allocation is made available to the reservation target for access and transmission of information during the remaining reservation period. Such information transmitted by the reservation target may be received by the reservation owner. Advantageously, access to the idle portion of the reservation allocation is made available to the reservation target without requiring the reservation target to acquire its own distinct reservation and without requiring the reservation target to contend against other neighboring terminal devices for access to the reservation allocation. According to another embodiment, the steps in FIG. 4 are performed from each side separately to establish a pair of EBDs (i.e., a first EBD and a second EBD), for symmetry and balance. Alternatively, a single reservation can be virtually dividing into two sections, wherein initial reservation ownership of the first section may be allocated to the reservation owner (the initial reservation owner of first section) and the initial reservation ownership of the second section may be allocated to the reservation target (the initial reservation owner of the second section). The two reservations (or the two virtual sections of a single reservation) may each occupy contiguous MAS slots, or their respective MAS may be interleaved with one another within a superframe. In yet other embodiments, interleaving the two reservations or (sections of one reservation) may be based on a priori knowledge of transmission window sizes of the higher layer protocol, to thereby minimize the number of ownership transfers needed and/or to allow higher layer acknowledgements (ACKs) to be implemented. Significant improvement in resource utilization can be achieved according to certain embodiments. For example, when compared to two separate hard reservations for bi-directional communication, two separate EBD reservations can almost double the medium utilization efficiency in some traffic situations. Various embodiments of the medium access rules by the owner and target of EDB reservations are outlined below. The path drawn from block 408 to 406 represents the various arrangements for subsequent access to the medium by the reservation owner and/or target according to the various embodiments discussed below.

According to one embodiment, the reservation target accesses the idle portion of the reservation allocation (step 408) by employing a prioritized access (PCA) scheme to avoid contention with the reservation owner. This embodiment is described in conjunction with graph 500 of FIG. 5. In FIG. 5, the horizontal axis represents time for accessing the reservation allocation during a reservation period for an EBD reservation. Block 502 represents the information transmission sequence by the reservation owner which terminates at time 510. Block 502 includes any MAC level ACK packets from the target followed by a designated silence period (e.g., SIFS=10.mu.s in ECMA 368). In the particular PCA scheme depicted in FIG. 5, the reservation target then waits a st first silent period 512 (such as 9.mu.s) and a second variable period (such as a dice period ranging from (0 to 3)*9.mu.s). If, at the conclusion of the second variable period at time 516, the reservation owner has not transmitted information, the reservation target can gain access to the medium and begin its transmission of information to the reservation owner. Since the second period is variable, the average wait time for the reservation target is depicted by wait period 518. In this particular CSMA/CA arrangement, the average wait period 518 is approximately 22.5.mu.s during which neither side transmits, whereas the same wait time for the reservation owner to start transmitting after the target's transmission sequence is 0. For bi-directional applications, using a pair of such EBDs (one in each direction) can therefore balance the average wait period in this scenario to 11.25 us for both; which may be advantageous if there is no a priori knowledge of the application.

According to another embodiment, the reservation target accesses the idle portion of the reservation allocation (step 408) according to a referenced access assignment scheme. This embodiment is described in conjunction with graph 600 of FIG. 6. Block 602 represents the information transmission sequence by the reservation owner which terminates at time 610. Block 602 includes any MAC level ACK packets from the target followed by a designated silence period (e.g., SIFS=10 us in ECMA 368). The idle portion of the reservation allocation following time 610 is subdivided into a plurality of slots, including slots 612, 614, 616, and 618, for example. Slots 612 and 616 are identified as even slots 0 and 2, respectively. Slots 614 and 618 are identified as odd slots 1 and 3, respectively. Additional even and odd slots follow slot 618 while the medium is idle. By way of example slots 612, 614, 616 and 618 may be 9 μs slots.

In the referenced access assignment scheme of FIG. 6, the reservation owner gains access to the idle reservation allocation by starting its transmission during an even slot, and the reservation target gains access to the idle reservation allocation by starting its transmission during an odd slot. Once the reservation owner or the reservation target gains medium access in this manner, the terminal device may continue information transmission over the remaining slots (both even and odd) of the reservation allocation during the remaining reservation duration. If information transmission is complete, and additional idle portion of the reservation allocations remains, the process is repeated with a new time reference 610. This particular embodiment reduces the wait time for accessing an idle reservation allocation, e.g., compared to wait time 518 of FIG. 5. Note that the owner of the EBD is allowed to initiate its transmission even at slot 0, hence its average wait time would be less than the average wait time for the target. For bi-directional applications, using a pair of such EBDs (one in each direction) can therefore balance the average wait period for both, which may be advantageous if there is no a priori knowledge of the application.

To enhance error recovery in the access assignment scheme of FIG. 6, if either reservation owner or reservation target receives a Header error, the device detecting the Header error can initiate a "backoff." A backoff typically involves executing a procedure or algorithm for refraining from accessing the medium during a particular period, typically as defined by the algorithm. An exemplary backoff technique for this purpose is disclosed in ECMA 368, although other backoff techniques may also be employed with the access assignment scheme discussed herein. In the case of improper termination of a frame exchange (e.g., failure to send or receive the expected Control packet response), the device can reset its slot timer (i.e. time reference 610) based on the calculated end of the missing response packet in order to provide additional error recovery. By way of example, in ECMA 368, if an expected Immediate ACK is not received in response to a Data frame, then the new time reference may be set to [End of the transmitted Data frame+SIFS+Fixed duration of the I-ACK frame (e.g., 13.125 us in ECMA 368)+SIFS].

According to another embodiment, the reservation target accesses the idle portion of the reservation allocation (step 408) according to an ownership transfer scheme. This embodiment is described in conjunction with graph 700 of FIG. 7. Block 702 represents the information transmission sequence by the reservation owner which terminates at time 710. Block 702 includes any MAC level ACK packets from the target followed by a designated silence period (e.g., SIFS=10 us in ECMA 368). In the ownership transfer scheme, the reservation owner may transfer ownership to the reservation target after completing its information transmission sequence at the end of block 702. In the embodiment of FIG. 7, the reservation owner transmits an outgoing clear to send (CTS) communication 714 to the reservation target to transfer ownership of the reservation allocation to the reservation target. In other embodiments, the CTS communication 714 can be replaced by a suitable communication for indicating transfer of ownership. By way of illustration, other forms of ownership-transfer messages may include a zero-length Command Frame with a new unique frame subtype; or a zero-length Control Frame with a new unique frame subtype; or an Application-Specific Command or Control frame; or a zero-length Data frame with unique values in the Access Information field, for example. Following reception of the CTS communication and a second wait time 716 (e.g., SIFS for ECMA 368 systems), reservation target assumes ownership of the reservation allocation and at time 719, may begin information transmission of block 720 to reservation target. At the conclusion of information transmission 720, the reservation target can transfer ownership back to the reservation owner by submitting its own CTS communication, which is received as an incoming CTS communication by reservation owner. However, if, at time 719, the reservation target does not have information to transmit to the reservation owner, the reservation target can transfer ownership back to the reservation owner by submitting its own CTS communication (not shown) at time 719, which is received as an incoming CTS communication by reservation owner. Ownership of the remaining reservation allocation can continue to be transferred back and forth during the reservation duration. Or the back and forth process may also be terminated via other power-save mechanisms already defined in the underlying MAC standard, if both sides do not anticipate new data for the rest of this reservation block or superframe.

Figure 8:
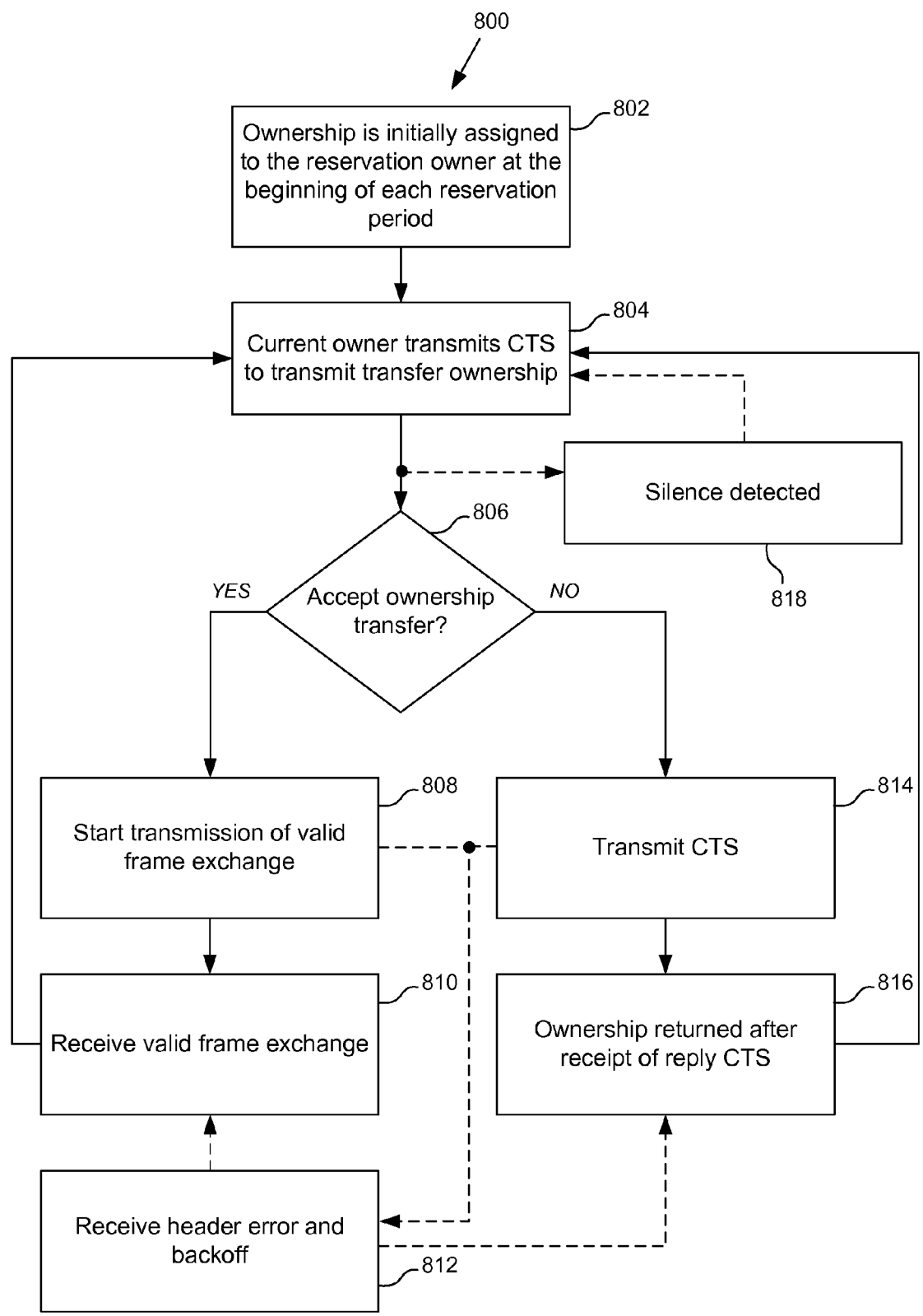
FIG. 8 is a flow chart illustrating an exemplary method for transferring medium ownership in accordance with one embodiment.

In certain situations, e.g. due to packet losses, the ownership of the reservation allocation may become ambiguous. To disambiguate ownership, the reservation owner and reservation target can perform the following steps outlined by flowchart 800 in FIG. 8. At step 802, ownership is initially assigned to the reservation owner at the beginning of each reservation period. At step 804, a device wishing to transfer ownership transmits an initial CTS to the other device. At decision step 806, the device that receives a CTS can accept or decline the transfer of ownership. If the device accepts the ownership transfer, the device starts transmission of any valid frame exchange following a designated silence period (e.g., SIFS=10 us in ECMA 368) to indicate acceptance of ownership grant at step 808. If the device declines ownership transfer, the device transmits a CTS following a designated silence period (e.g., SIFS=10 us in ECMA 368) at step 814.

At step 810, the initial CTS sender can determine that the ownership transfer was accepted, upon receipt of the valid frame exchange initiated by the other device (receipt of which concludes in a successful transfer of ownership). Following step 810, Step 804 can be repeated to transfer ownership again.

The initial CTS sender can determine that the grant was declined, upon receiving a valid reply CTS after a designated silence period (e.g., SIFS=10 us in ECMA 368) as indicated by block 816, after which step 804 can be repeated. On the other hand, at step 818, if following its CTS transmission, the initial CTS sender detects silence (no preamble) after a designated silence period (e.g., SIFS=10 us in ECMA 368), the initial CTS sender can speculatively determine a CTS was sent by the other device (but missed locally) or that the other device failed to receive the sender's CTS transmission, and send another CTS at step 804, after a designated silence period (e.g., SIFS=10 us in ECMA 368) following the end of the missed CTS. In certain embodiments, retransmission of CTS communications can be limited to a predetermined number to address situations where the CTS Sender missed the valid frame exchange that was started by the other device. This limited or predetermined number of CTS retransmissions can assist in limiting the number of such data packets colliding with CTS packets.

At step 812, the initial CTS sender may optionally receive a packet with Header error, in which case the device shall back off, e.g., as defined in ECMA 368, or until another CTS is received. In the case of received packet with Header error, the initial CTS sender can also assume than ownership transfer was accepted, if after the backoff, the initial CTS sender receives a valid frame exchange as indicated by optional path to step 810. On the other hand, the initial CTS sender can assume than ownership transfer was declined, if after the backoff, the initial CTS sender receives a valid CTS as indicated by optional path to step 816.

In certain embodiments of the ownership transfer scheme, after a threshold number of outgoing and incoming CTS communications are transmitted without intervening information data transmission, the reservation owner may cease communication with the reservation target and may release the reservation by transmitting an appropriate announcement message and receiving a confirmation reply. A particular benefit of the explicit ownership transfer scheme (compared to the preceding two implicit methods) is that the owner (and target) can more readily accommodate fluctuations in data arrival from upper layers. The reason is by making the medium access dependent upon the owner explicitly relinquishing ownership by transmitting a CTS communication (instead of contention scheme based on idle periods), the owner can evaluate new application data (or any other higher layer data, such as TCP/IP or UDP or Bluetooth L2CAP traffic, for example) queued during 702, and can decide to retain ownership by not transmitting a CTS communication if it detects additional data to transmit. In the preceding two implicit ownership schemes of FIGS. 5 and 6, extending the medium ownership duration beyond the end of the current transmission sequence can be facilitated by the reservation owner since the owner has preferential access. However, the process is more challenging for the reservation target, since the virtual extension (of blocks 502 or 602) has to be committed and signaled in the header of the current packet; such an approach provides less flexibility for late-binding decisions. To do this effectively will require the transmission of additional communications, such as null payload packets, for example, to terminate a speculative extension if new application data does not materialize in time. An example of a virtual extension mechanism is described in 802.11 and ECMA 368, wherein null data packet transmission is permitted for a traditional contention-based approach. In the context of the present disclosure, however, a null data packet can be used to enable late binding decision for a device to retain/release current ownership. For example, if the last packet in the queue is detected, the medium occupancy duration (marked in the header) can be extended to cover an extra duration beyond the present packet by an amount that allows a null data packet to be sent. Therefore if new application data arrives within the extra duration period, the newly arrived data can be transmitted with a new duration extension in the header; otherwise a null data packet is sent with no more duration extension. In contrast to a null data packet approach, the explicit CTS method of FIG. 7 provides more flexibility without necessitating the null data packets and speculative duration extensions.

In FIG. 7 the CTS communication may be about 13 µs and the wait period 716 may be about 10 µs (e.g., SIFS for ECMA 368), and thus an overhead expense 718 can be about 23 µs. The embodiment of FIG. 7 can be modified in an alternative embodiment to avoid or defer the overhead expense 718 when the "non-owner" has no pending data to transmit. In the alternative embodiment, in addition to the current owner of the reservation allocation being able to initiate ownership transfer by way of CTS communication 714, the current "non-owner" may also solicit ownership, e.g., by transmitting a block acknowledgement (B-ACK) communication with unique fields, which solicits CTS communication 714 by the current owner. Accordingly, the non-owner can more quickly gain ownership of the reservation allocation, and thereby reduce its wait time for medium access. It also allows the current owner to decide whether to cede ownership, even if it has more data to transmit. It is noted that it may not be prudent for the current non-owner to assume ownership of the medium by simply transmitting a Zero B-ACK RX window, since this B-ACK may sometimes be lost or corrupted. For the same reason, it may not be prudent for the current owner to simply grant ownership by sending a B-ACK Request in its last transmission. Therefore, the transmission of the CTS is desirable, even after the B-ACK. Whereas recovery mechanisms for loss/corruption of CTS packets are easier to define as described above since it may be a fixed size control packet with no payload.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for reserving medium access in an ad hoc network, comprising: transmitting a reservation request by a reservation owner, the reservation request identifying a reservation allocation, a reservation target, and a reservation type, the reservation type identifying exclusive use of the reservation allocation for transmission of information by the reservation owner and the reservation target during a reservation period.

2. The method of claim 1, wherein the reservation target employs a prioritized contention access (PCA) scheme to access the reservation allocation.

3. The method of claim 1, wherein an idle portion of the reservation allocation is subdivided into a plurality of slots including even slots and odd slots, the reservation owner gaining access to the idle portion by starting to transmit during an even slot, the reservation target gaining access to the idle portion by starting to transmit during an odd slot.

4. A method for reserving medium access in an ad hoc network, comprising:
    transmitting a reservation request by a reservation owner, the reservation request identifying a reservation allocation, a reservation target, and a reservation type, the reservation type identifying exclusive use of the reservation allocation by the reservation owner and the reservation target during a reservation period;
    wherein the reservation owner, identified as an initial reservation owner, transmits an outgoing clear to send (CTS) communication to the reservation target, identified as an initial reservation target, to transfer current ownership of the reservation allocation to the initial reservation target.

5. The method of claim 4, wherein the initial reservation owner subsequently receives an incoming clear to send (CTS) communication from the initial reservation target to regain current ownership of the reservation allocation.

6. The method of claim 5, wherein after a threshold number of outgoing and incoming clear to send (CTS) communications without intervening data transmission, the reservation owner ceases communication with the reservation target.

7. The method of claim 5, wherein a current reservation owner receives an incoming block acknowledgement (B-ACK) communication from a current reservation target, and determines that the current reservation target is soliciting medium ownership, based on Receive Window information in the received B-ACK.

8. The method of claim 7, wherein the current reservation owner sends a CTS communication to the current reservation target to transfer current ownership to the current reservation target based on information in the B-ACK.

9. The method of claim 8, wherein the current reservation owner sends the CTS communication further based on a transmission queue status of the current reservation owner.

10. The method of claim 4, further comprising:
    detecting silence after a designated silence period following transmission of the CTS communication;
    speculatively determining a response CTS was sent by the other device based on detecting the silence;
    transmitting subsequent CTS communication based on the determining step.

11. The method of claim 4, further comprising:
    receiving a packet with header error, in response to the outgoing CTS;
    backing off a backoff period;
    determining if a response CTS is received during the backoff period;
    transferring ownership back to the initial reservation owner if a response CTS is received;
    determining if a valid frame exchange occurs during the backoff period;
    determining that the transfer of ownership to the reservation target was accepted if the valid frame exchange occurs during the backoff period.

12. The method of claim 3, further comprising:
  detecting an improper termination of a frame exchange between the reservation owner and the reservation target;
  resetting a time reference associated with an idle portion of the reservation allocation based on a calculated end of a missing response packet associated with the improper termination.

13. The method of claim 1, wherein the reservation allocation includes at least one medium access slot (MAS) of a plurality of medium access slots of a medium access channel superframe.

14. The method of claim 1, wherein the reservation owners is identified as the first reservation owner, and the reservation target is identified as the first reservation target, the method further comprising:
  transmitting a second reservation request by the first reservation target, the second reservation request identifying a second reservation allocation, a second reservation target corresponding to the first reservation owner, and a second reservation type, the second reservation type identifying exclusive use of the second reservation allocation by the first reservation owner and the first reservation target during a second reservation period.

15. The method of claim 14, wherein the first and second reservation allocations occupy one of: contiguous medium access slots (MAS) within a superframe and interleaved medium access slots (MAS) within a superframe.

16. The method of claim 15, wherein the interleaved MAS is based on transmission window sizes of a higher layer protocol.

17. The method of claim 1, wherein the reservation allocation is virtually divided into a first section and a second section, wherein the reservation owner is identified as the initial reservation owner of the first section, and the reservation target is identified as the initial reservation owner of the second section.

18. The method of claim 17, wherein the first and second sections occupy one of: contiguous medium access slots (MAS) within a superframe and interleaved medium access slots (MAS) within a superframe.

19. The method of claim 18, wherein the interleaved MAS is based on transmission window sizes of a higher layer protocol.

20. A wireless communication device identified as a reservation owner comprising:
  a transceiver coupled to an antenna;
  a processor coupled to the transceiver;
  a memory coupled to the processor, the processor adapted to transmit a reservation request, the reservation request identifying a reservation allocation, a reservation target, and
  a reservation type, the reservation type identifying exclusive use of the reservation allocation for transmission of information by the reservation owner and the reservation target during a reservation period.

21. A wireless communication device comprising:
  means for transmitting a reservation request by a reservation owner, the reservation request identifying a reservation allocation, a reservation target, and a reservation type, the reservation type identifying exclusive use of the reservation allocation for transmission of information by the reservation owner and the reservation target during a reservation period.

22. A computer program product, comprising:
  computer-readable medium comprising:
  code for causing a computer to transmit a reservation request by a reservation owner, the reservation request identifying a reservation allocation, a reservation target, and a reservation type, the reservation type identifying exclusive use of the reservation allocation for transmission of information by the reservation owner and the reservation target during a reservation period.

23. An ad hoc network system comprising:
  a reservation owner;
  a reservation target, the reservation owner adapted to transmit a reservation request, the reservation request identifying a reservation allocation, the reservation target, and
  a reservation type, the reservation type identifying exclusive use of the reservation allocation for transmission of information by the reservation owner and the reservation target during a reservation period.

24. The system of claim 23 wherein an idle portion of the reservation allocation is subdivided into a plurality of slots including even slots and odd slots, the reservation owner gaining access to the idle portion by starting to transmit during an even slot, the reservation target gaining access to the idle portion by starting to transmit during an odd slot.

25. An ad hoc network system comprising:
  a reservation owner;
  a reservation target, the reservation owner adapted to transmit a reservation request, the reservation request identifying a reservation allocation, the reservation target, and
  a reservation type, the reservation type identifying exclusive use of the reservation allocation by the reservation owner and the reservation target during a reservation period;
  wherein the reservation owner, identified as an initial reservation owner, transmits an outgoing clear to send (CTS) communication to the reservation target, identified as an initial reservation target, to transfer current ownership of the reservation allocation to the initial reservation target.

26. The method of claim 1, wherein the reservation type identifies exclusive use of the reservation allocation for bi-directional transmission of information frames by the reservation owner and the reservation target during the reservation period.

27. The method of claim 1, wherein the reservation type allowing transmission of information by the reservation owner in one or more slots during the reservation period and allowing transmission of information by the reservation target in one or more further slots during the same reservation period.

28. The method of claim 1, wherein the reservation type allowing transmission of information by the reservation owner during at least one first portion of the reservation period and allowing transmission of information by the reservation target during at least one second portion of the same reservation period without requiring the reservation target to acquire a distinct reservation.

* * * * *